UNITED STATES PATENT OFFICE.

MARY P. R. TILTON, OF NEW YORK, N. Y.

COMPOUND FOR SETTLING COFFEE.

SPECIFICATION forming part of Letters Patent No. 411,075, dated September 17, 1889.

Application filed January 29, 1889. Serial No. 297,980. (No specimens.)

*To all whom it may concern:*

Be it known that I, MARY P. R. TILTON, a citizen of the United States, and a resident of the city, county, and State of New York, have invented certain Improvements in Clarifying Compounds, of which the following is a specification.

My invention relates to compounds for clarifying and settling coffee and similar decoctions; and it consists of a compound of which the ingredients are albumen, gelatine, starch, and sugar in proper proportions, thoroughly mixed and allowed to dry and crystallize, as will be more particularly set forth hereinafter.

My object is to produce a clarifying compound that may be put up in a dry, comminuted, and finely-crystalline form in suitable boxes or packages for use and sale. To this end I usually proceed as follows in the preparation of the compound:

I take the whites of one dozen eggs, consisting almost wholly of albumen; of gelatine, about one-fifth part, by weight, of the albumen; of corn-starch, about one-fourth of an ounce, and of sugar about two pounds. These are put into a suitable vessel and thoroughly mixed together and beaten. The mixture is then allowed to dry, when it will be found to consist of a finely-crystalline mass. This mass is broken up into fragments or bits of any convenient size, and may be then put up in boxes or packages for sale and use.

I prefer to employ the refined forms of gelatine—dry and pulverized—and the refined and higher grades of sugar; but I do not limit myself in this respect, nor to the use of albumen from whites of eggs, nor to starch from Indian corn. These substances derived from other sources may be used.

The proportions of the ingredients herein set forth will produce good results; but they may be varied to some extent without departing materially from the principles of my invention.

In using my clarifier, after the decoction is boiled in the usual way it is removed from the fire and a tea-spoonful of the compound for each part of the liquid is added to it. The liquid should be allowed to stand while the crystals are dissolving, and the compound will be found to grasp and carry down all the fine floating particles that render the decoction turbid, thus settling and clarifying it. Good results may be had by dissolving the clarifier in a little water and adding it to the decoction in that form, or by adding the clarifier in its crystalline form to the coffee while it is boiling. The crystalline compound may also be pulverized or powdered and mixed with the proper proportion of ground coffee, and this may be done before the coffee is put on sale or after it has been purchased for use, as preferred.

My clarifying compound, when prepared in the manner described, is not affected unfavorably by varying temperatures nor by humidity of the atmosphere, and consequently its clarifying properties will be retained for a long time, if only ordinary care be taken.

The albumen and gelatine in my compound perform the clarifying functions in the main, and the sugar, together with the small percentage of corn-starch, performs another but very important part. If powdered albumen or gelatine be put in a liquid decoction, the particles gather together and form lumps, of which only the superficial portions become wet, the inner particles remaining dry for a long time. Sugar, being readily soluble in water, does not do this. In my compound the sugar and starch are interposed between the particles of gelatine and those of albumen, and the said particles out of contact with each other, yet uniting the whole in a mass. When bits of the compound are placed in the decoction, the particles of sugar dissolve readily, and permit the liquid to surround and embrace each particle of the gelatine and albumen, thus insuring against the formation of lumps. The coating of the particles of albumen and gelatine with sugar serves to preserve them ready for use, and the starch renders the sugar less sensitive to the effects of moisture while the compound is being preserved for use.

Having thus described my invention, I claim—

The herein-described composition of matter to form a clarifier for coffee and similar decoctions, which consists of a crystalline compound of albumen, gelatine, starch, and sugar intimately mixed together in about the proportions specified.

In witness whereof I have hereunto signed my name in the presence of two subscribing witnesses.

MARY P. R. TILTON.

Witnesses:
  HENRY CONNETT,
  JOHN D. CAPLINGER.